United States Patent
Peng et al.

(10) Patent No.: US 12,400,315 B2
(45) Date of Patent: Aug. 26, 2025

(54) SPINNING BOX DETECTION METHOD, ELECTRONIC DEVICE AND STORAGE MEDIUM

(71) Applicants: ZHEJIANG HENGYI PETROCHEMICAL CO., LTD., Zhejiang (CN); Fujian Yijin Chemical Fiber Co., Ltd., Fujian Province (CN)

(72) Inventors: Xiantao Peng, Zhejiang (CN); Peng Wang, Zhejiang (CN); Yibo Qiu, Zhejiang (CN); Mingyi Liu, Zhejiang (CN); Junliang Jin, Zhejiang (CN); Dake Li, Zhejiang (CN); Dandan Wang, Zhejiang (CN)

(73) Assignees: ZHEJIANG HENGYI PETROCHEMICAL CO., LTD., Zhejiang (CN); Fujian Yijin Chemical Fiber Co., Ltd., Fujian Province (CN)

( * ) Notice: Subject to any disclaimer, the term of this patent is extended or adjusted under 35 U.S.C. 154(b) by 0 days.

(21) Appl. No.: 18/950,806

(22) Filed: Nov. 18, 2024

(65) Prior Publication Data
US 2025/0252553 A1    Aug. 7, 2025

(30) Foreign Application Priority Data
Feb. 5, 2024    (CN) .................. 202410166863.X

(51) Int. Cl.
*G06T 7/00*    (2017.01)
*G06T 7/73*    (2017.01)

(52) U.S. Cl.
CPC .............. *G06T 7/0008* (2013.01); *G06T 7/73* (2017.01); *G06T 2207/20064* (2013.01);
(Continued)

(58) Field of Classification Search
CPC ................. G06T 7/0008; G06T 7/73; G06T 2207/20064; G06T 2207/20084; G06T 2207/30124; G06T 2207/30242
See application file for complete search history.

(56) References Cited

U.S. PATENT DOCUMENTS 9,836,433 B1 * 12/2017 Hoke .................. G06T 7/33
11,983,854 B2 * 5/2024 Isik .................... G06T 3/40
(Continued)

FOREIGN PATENT DOCUMENTS

CN    110969600 A    4/2020
CN    111815564 A    10/2020
(Continued)

OTHER PUBLICATIONS

Japanese Patent Office; Notice of Grounds for Refusal; Japanese Application No. 2025-008979; 5 pages; dated Feb. 12, 2025.
(Continued)

*Primary Examiner* — Bobbak Safaipour
(74) *Attorney, Agent, or Firm* — Faegre Drinker Biddle & Reath LLP

(57) ABSTRACT

Provided is a spinning box detection method, an electronic device and a storage medium. The method includes: obtaining an image to be detected of a spinning box when determining that the spinning box meets a preset defect detection condition; and inputting the image to be detected into a target detection model to obtain a target detection result of the spinning box; wherein the target detection model is used to detect whether there is a defect in the spinning box to obtain the target detection result; and the target detection result comprises at least one of: a total quantity of defects, a defect position or a defect type.

20 Claims, 9 Drawing Sheets

S101 — Obtaining an image to be detected of a spinning box when determining that the spinning box meets a preset defect detection condition S102 — Inputting the image to be detected into a target detection model to obtain a target detection result of the spinning box

(52) U.S. Cl.
CPC ............... *G06T 2207/20084* (2013.01); *G06T 2207/30124* (2013.01); *G06T 2207/30242* (2013.01)

(56) References Cited

U.S. PATENT DOCUMENTS

| | | | |
|---|---|---|---|
| 2020/0263325 A1* | 8/2020 | Fan | D01D 5/088 |
| 2025/0086776 A1* | 3/2025 | Peng | G06V 10/44 |

FOREIGN PATENT DOCUMENTS

| | | |
|---|---|---|
| CN | 113658131 A | 11/2021 |
| CN | 114201993 A | 3/2022 |
| CN | 115760747 A | 3/2023 |
| CN | 116071309 A | 5/2023 |
| CN | 116167992 A | 5/2023 |
| CN | 116485735 A | 7/2023 |
| CN | 116993710 A | 11/2023 |
| CN | 117197087 A | 12/2023 |
| CN | 117278722 A | 12/2023 |
| JP | 2021156641 | 10/2021 |
| WO | 2020113773 A1 | 6/2020 |

OTHER PUBLICATIONS

Japanese Patent Office; Notice of Allowance; Japanese Application No. 2025-008979; 3 pages; dated Apr. 8, 2025.
European Patent Office; European Extended Search Report; EP Application No. 24212812.2; 10 pages; dated Apr. 29, 2025.
The State Intellectual Property Office of People's Republic of China; CN First Office Action; CN Application No. 202410166863.X; 17 pages; dated May 20, 2025.
Liu, Jinhai et al.; A Dynamic Weights-Based Wavelet Attention Neural Network for Defect Detection; IEEE Transactions on Neural Networks and Learning Systems; IEEE, vol. 35, No. 11; 11 pages; dated Jul. 12, 2023.

* cited by examiner

SPINNING BOX DETECTION METHOD, ELECTRONIC DEVICE AND STORAGE MEDIUM

CROSS-REFERENCE TO RELATED APPLICATIONS

The present application claims priority to Chinese Patent Application No. CN202410166863.X, filed with the China National Intellectual Property Administration on Feb. 5, 2024, the disclosure of which is hereby incorporated herein by reference in its entirety.

TECHNICAL FIELD

The present disclosure relates to the field of artificial intelligence technology, and in particular to a spinning box detection method and apparatus, a device and a storage medium.

BACKGROUND

In the chemical fiber industry, abnormal conditions such as yarn floating, yarn breakage, yarn misalignment, yarn hooking, tilt of an oil nozzle, tilt of a yarn guide hook and yarn being not in the yarn guide hook may easily occur in the spinning box due to the long-time work of the spinning box during a process of producing chemical fiber yarns in the spinning box. Therefore, it is usually necessary for the staff to detect a spinneret plate, yarns, the yarn guide hook and the oil nozzle in the spinning box. However, this detection method has a strong dependence on manual experience and is inefficient, so as to affect the production quality and production efficiency of yarns.

SUMMARY

The present disclosure provides a spinning box detection method and apparatus, a device and a storage medium, to solve or alleviate one or more technical problems in the related art.

In a first aspect, the present disclosure provides a spinning box detection method, including:
  obtaining an image to be detected of a spinning box when determining that the spinning box meets a preset defect detection condition; and
  inputting the image to be detected into a target detection model to obtain a target detection result of the spinning box; where the target detection model is used to detect whether there is a defect in the spinning box to obtain the target detection result; and the target detection result includes at least one of: a total quantity of defects, a defect position or a defect type.

In a second aspect, the present disclosure provides a spinning box detection apparatus, including:
  an obtaining unit configured to obtain an image to be detected of a spinning box when determining that the spinning box meets a preset defect detection condition; and
  a detection unit configured to input the image to be detected into a target detection model to obtain a target detection result of the spinning box; where the target detection model is used to detect whether there is a defect in the spinning box to obtain the target detection result; and the target detection result includes at least one of: a total quantity of defects, a defect position or a defect type.

In a third aspect, provided is an electronic device, including:
  at least one processor; and
  a memory connected in communication with the at least one processor;
  where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

The beneficial effects of the technical solution provided in the present disclosure at least include: the target detection model can be utilized to perform defect detection on the spinning box to obtain the target detection result, thereby improving the accuracy of defect detection for the spinning box; and compared with the existing manual detection, the solution of the present disclosure can perform defect detection on the spinning box without relying on manual experience, thereby realizing an automated process of defect detection for the spinning box, saving a lot of manpower and time costs, and thus improving the detection efficiency of the spinning box.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

During a spinning process of a spinning box, abnormal conditions such as yarn floating, yarn breakage, yarn misalignment, yarn hooking, tilt of an oil nozzle, tilt of a yarn guide hook and yarns being not in the yarn guide hook may easily occur in the spinning box due to the long-time operation of the spinning box. Therefore, it is usually necessary for the staff to detect a spinneret plate, yarns, the yarn guide hook and the oil nozzle in the spinning box. However, this detection method requires a lot of manpower and time costs and has a strong dependence on manual experience; and defects such as yarn floating and yarn hooking in the spinning box are relatively subtle and difficult to distinguish. The use of the manual detection method has problems such as low efficiency and easy error, thereby affecting the production quality and production efficiency of yarns. Therefore, an automated processing flow is urgently needed to efficiently detect defects in the spinning box.

Based on this, the present disclosure provides a spinning box detection method to solve the above problems.

Figure 1:
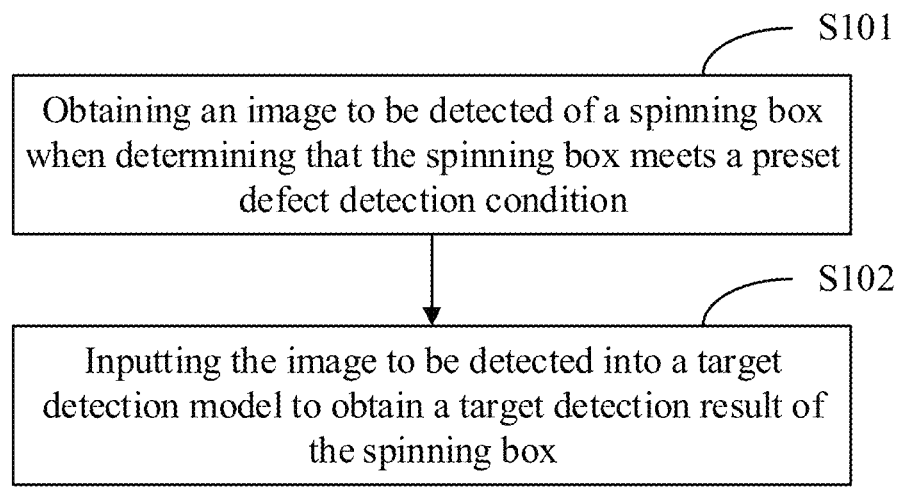
FIG. 1 is a first schematic flow chart of a spinning box detection method according to an embodiment of the present disclosure.

Specifically, FIG. 1 is a first schematic flow chart of a spinning box detection method according to an embodiment of the present disclosure. This method is optionally applied to electronic devices, such as personal computers, servers, server clusters and other electronic devices.

Further, this method includes at least a part of the following content. As shown in FIG. 1, this method includes the following steps.

Step S101: An image to be detected of a spinning box is obtained when it is determined that the spinning box meets a preset defect detection condition.

Here, in a specific example, the image to be detected of the spinning box is obtained by using an image acquisition device to acquire an image of the spinning box. Further, the image acquisition device may specifically include a yarn path inspection robot (with a device having an image acquisition function (such as a camera) built in). For example, the yarn path inspection robot is used to photograph the spinning box to obtain the image to be detected, or acquire a video of the spinning box for a preset duration to obtain a plurality of continuous video frames, and select an image from the continuous video frames as the image to be detected, so as to facilitate subsequent defect detection for the spinning box.

Further, in a specific example, the image to be detected at least includes image content of a spinneret plate, yarns, a yarn guide hook and an oil nozzle.

Further, in a specific example, the image to be detected may be obtained in the following manner. Specifically, the above step of obtaining the image to be detected of the spinning box when determining that the spinning box meets a preset defect detection condition (for example, the above step S101) specifically includes:

obtaining the image to be detected of the spinning box when determining that one of following conditions is met:

condition 1: a detection time of the spinning box reaches preset detection time;

condition 2: there are degraded yarn spindles among a plurality of yarn spindles obtained based on the spinning box; or condition 3: a quantity of degraded yarn spindles among the plurality of yarn spindles obtained based on the spinning box is greater than a first threshold.

Here, the first threshold is an empirical value, and may be set according to actual needs in practical applications. The first threshold is not specifically limited in the solution of the present disclosure.

In this way, the solution of the present disclosure can start defect detection for the spinning box (for example, trigger an image acquisition device to perform image acquisition on the spinning box to further obtain the image to be detected of the spinning box) when at least one of the above conditions is met, so as to obtain the detection result of the defect detection. Thus, the defect situation of the current spinning box can be quickly known, laying the foundation for subsequently improving the quality of spinning in the spinning box.

Step S102: The image to be detected is input into a target detection model to obtain a target detection result of the spinning box.

Here, the target detection model is used to detect whether there is a defect in the spinning box to obtain the target detection result; and the target detection result includes at least one of: a total quantity of defects, a defect position or a defect type. Thus, compared with the existing manual detection, defect data in the spinning box can be accurately obtained, further improving the efficiency of defect detection.

Further, in a specific example, the defect detection of the spinning box may specifically refer to the detection of the following defects: yarn floating, yarn breakage, yarn misalignment, a biased yarn guide hook, a biased oil nozzle, and foreign matters on a yarn path, etc.

Further, in a specific example, main types of yarns involved in the solution of the present disclosure may include one or more of partially oriented yarns (POY), fully drawn yarns (FDY) and the like. For example, the types of yarns may specifically include polyester partially oriented yarns, polyester fully drawn yarns, polyester drawn yarns, polyester draw textured yarns, etc.

Thus, the solution of the present disclosure can utilize the target detection model to perform defect detection on the spinning box to obtain the target detection result, thereby improving the accuracy of defect detection for the spinning box; and compared with the existing manual detection, the solution of the present disclosure can perform defect detection on the spinning box without relying on manual experience, thereby realizing an automated process of defect detection for the spinning box, saving a lot of manpower and time costs, and thus improving the detection efficiency of the spinning box.

Further, since automated and accurate defect detection can be performed on the spinning box, corresponding measures can be subsequently taken in time based on the obtained detection result (such as target inspection result), such as generating prompt information or warning information or the like to prompt the staff or robot to repair the spinning box, thereby providing support for further improving the production quality and production efficiency of spinning.

In an example, the target detection model may specifically be a dynamic weights-based wavelet attention neural network (DWWA-Net) or may be any other model with target detection capability, which is not limited in the solution of the present disclosure.

Further, in an example, the target detection model may be a DWWA-Net or may be any other model improved based on dynamic wavelet convolution networks (DWCNet), which is not specifically limited in the solution of the present disclosure.

Further, in a specific example, the target detection model at least includes a first network layer, a second network layer and a third network layer.

Figure 2A:
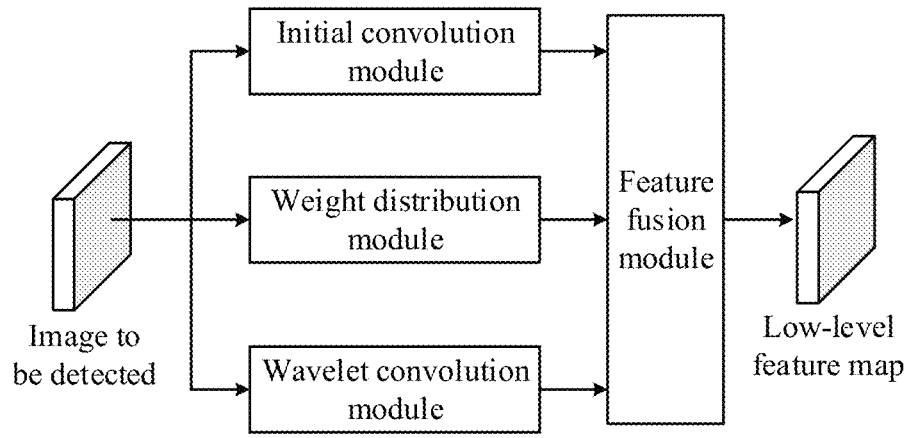
FIG. 2(a) is a structural schematic diagram of a first network layer according to an embodiment of the present disclosure.

Specifically, the first network layer is used to filter out background noise from the input image to be detected to extract a low-level feature map. For example, the first network layer is a dynamic wavelet convolution network. Further, as shown in FIG. 2(a), the first network layer at least includes an initial convolution module, a weight distribution module, a wavelet convolution module and a feature fusion module; the initial convolution module is configured to at least perform wavelet transform on the image to be detected to obtain a first low-frequency feature map; the weight distribution module is configured to obtain a target weight factor of a feature map of the input image; the wavelet convolution module is configured to perform wavelet transform on the image to be detected to obtain a global feature map representing a low-frequency component and a high-frequency component; and the feature fusion module is configured to fuse the first low-frequency feature map with the global feature map based on the target weight factor to filter out the background noise and obtain the low-level feature map.

Further, the second network layer is used to perform feature enhancement on the low-level feature map to obtain a high-level feature map; for example, in an example, the second network layer may be specifically used to enhance key feature information in the low-level feature map while suppressing irrelevant feature information in the low-level feature map, such as suppressing feature information irrelevant to the yarn spindle, to obtain the high-level feature map.

Further, the third network layer is used to perform defect recognition based on the high-level feature map to obtain the target detection result.

Thus, the solution of the present disclosure provides a specific example of a model for rapid defect detection of the spinning box, thereby achieving efficient detection of defects in the spinning box. Especially for weak defects (such as yarn floating, yarn hooking, etc.) difficult to be detected in the spinning box, the accuracy of defect detection of the spinning box is further improved, laying a foundation for subsequent improvements in the production quality and production efficiency of spinning.

Further, in a specific example, the initial convolution module is specifically configured to convolve the image to be detected to obtain a first convolution feature map, and perform wavelet transform on the obtained first convolution feature map to obtain the first low-frequency feature map. For example, in an example, the image to be detected is convolved to obtain a feature map after convolution (such as the first convolution feature map); secondly, the feature map after convolution is subjected to wavelet decomposition to obtain a plurality of feature maps; and finally, the plurality of feature maps obtained are input into a low-pass filter to perform low-pass filter convolution to obtain the first low-frequency feature map. In this way, the low-noise feature map can be effectively extracted, laying a foundation for subsequent improvement in the accuracy of defect detection.

Further, in a specific example, the weight distribution module is configured to convolve the image to be detected to obtain a second convolution feature map, perform wavelet transform on the obtained second convolution feature map to obtain a second low-frequency feature map, and perform nonlinear transform on the obtained second low-frequency feature map to obtain the target weight factor. In this way, the solution of the present disclosure can make full use of the importance degree of the low-noise low-frequency feature map in the original image (such as the image to be detected) to adjust the background noise in the image to be detected. Especially for relatively subtle defects (such as yarn floating and yarn hooking), effective feature information can be conveniently identified, laying a foundation for subsequent improvement in the accuracy of defect detection.

Further, in a specific example, the feature fusion module is configured to process the first low-frequency feature map and the target weight factor at element level (such as element multiplication), process the global feature map and the target weight factor at element level, and perform element addition of results obtained after processing at element level to filter out the background noise and obtain the low-level feature map, thus extracting effective feature information to improve the detection accuracy of defects of yarns in the spinning box.

In this way, the feature fusion module can effectively combine the extracted local feature information (such as the first low-frequency feature map) with the global feature information (such as the global feature map) to obtain a feature map with higher quality, thus making it easier to capture the effective feature information of defects, thereby improving the accuracy of defect detection and laying a foundation for subsequent improvements in the production quality and production efficiency of spinning.

Figure 2B:
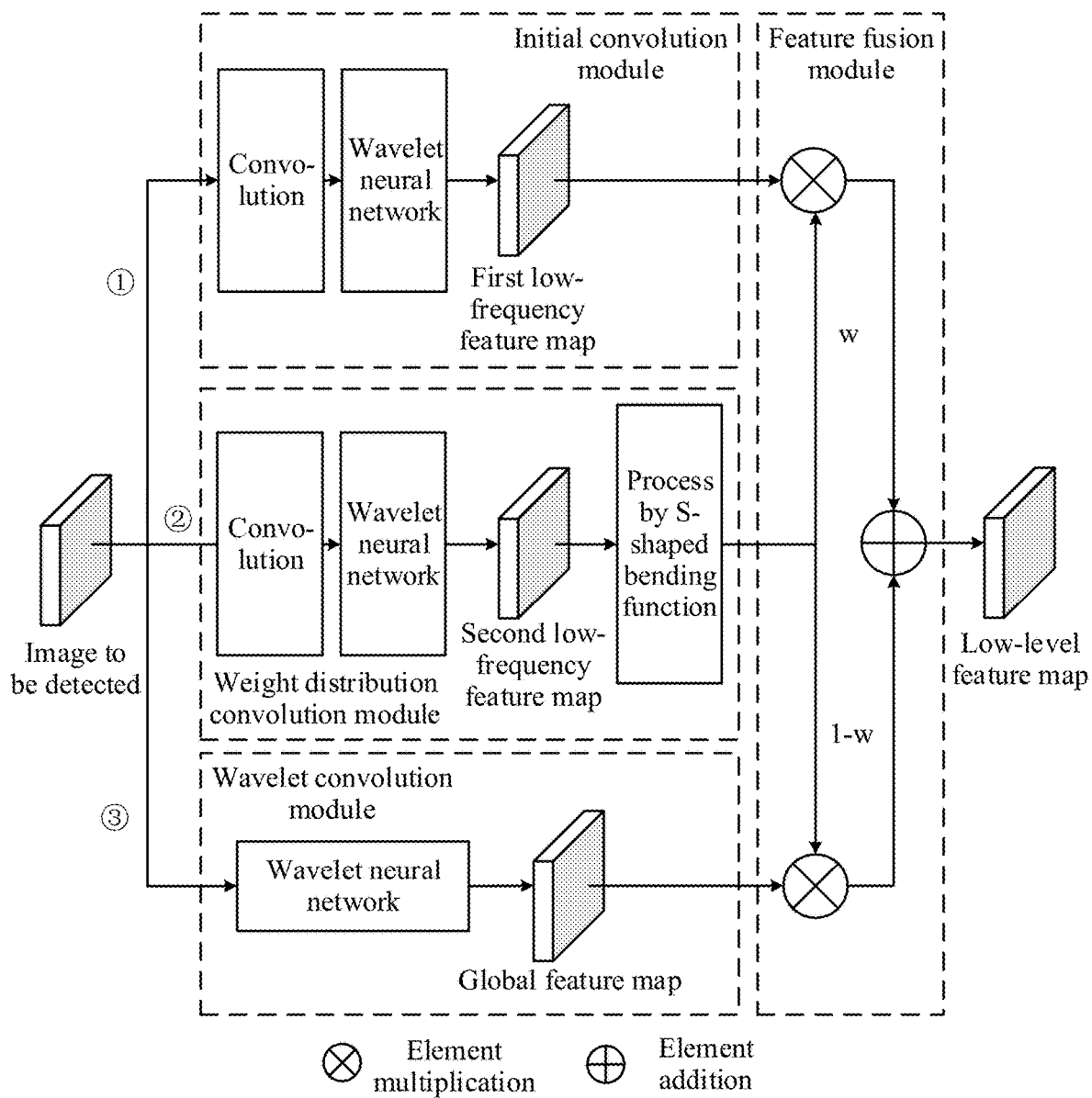
FIG. 2(b) is a structural schematic diagram of a first network layer in an example according to an embodiment of the present disclosure.

For example, as shown in FIG. 2(b), the first network layer is DWCNet, which includes three branches, where the image to be detected is input to the convolution layer through branch 1 (i.e., ① shown in the figure) for convolution, and the obtained result is input to the wavelet neural network to obtain the first low-frequency feature map; the image to be detected is input to the convolution layer through branch 2 (i.e., ② shown in the figure) for convolution, the obtained result is input to the wavelet neural network to obtain the second low-frequency feature map, and then the second low-frequency feature map is input into the S-shaped bending function (Sigmoid) to obtain the target weight factor (for example, the target weight factor w or the target weight factor 1-w); the image to be detected is input to the wavelet neural network through branch 3 (i.e., ③ shown in the figure) to obtain the global feature map for representing low-frequency information and high-frequency information; the element multiplication of the target weight factor (such as w) and the first low-frequency feature map is performed, the element multiplication of 1-w and the global feature map is performed, and the element addition of results obtained after element processing is performed, to filter out the background noise and obtain the low-level feature map. Thus, the feature map with higher quality is obtained by combining the extracted local feature information (such as the first low-frequency feature map) with the global feature information (such as the global feature map), thereby making it easier to capture the feature information of the image, then improving the accuracy of defect detection, and laying a foundation for subsequent improvements in the production quality and production efficiency of spinning.

In another example of the solution of the present disclosure, the second network layer at least includes a first sub-network layer, a second sub-network layer and a third sub-network layer.

Here, the first sub-network layer is used to extract features from the low-level feature map, and fuse a plurality of feature maps extracted to obtain M initial fused feature maps, where M is an integer greater than or equal to 2; the second sub-network layer is used to extract key features from each of the M initial fused feature maps, and perform feature enhancement on the key feature information extracted from each initial fused feature map to obtain M target enhanced feature maps; and the third sub-network layer is used to fuse the M target enhanced feature maps obtained to obtain the high-level feature map. Thus, the clear and rich feature information (for example, the high-level feature map) can be obtained, thereby improving the accuracy of defect detection. Especially for weak defects (yarn floating, yarn hooking, etc.) difficult to be detected in the spinning box, the detection accuracy of the weak defects is significantly improved, laying a foundation for subsequent improvements in the production quality and production efficiency of spinning.

Figure 3A:
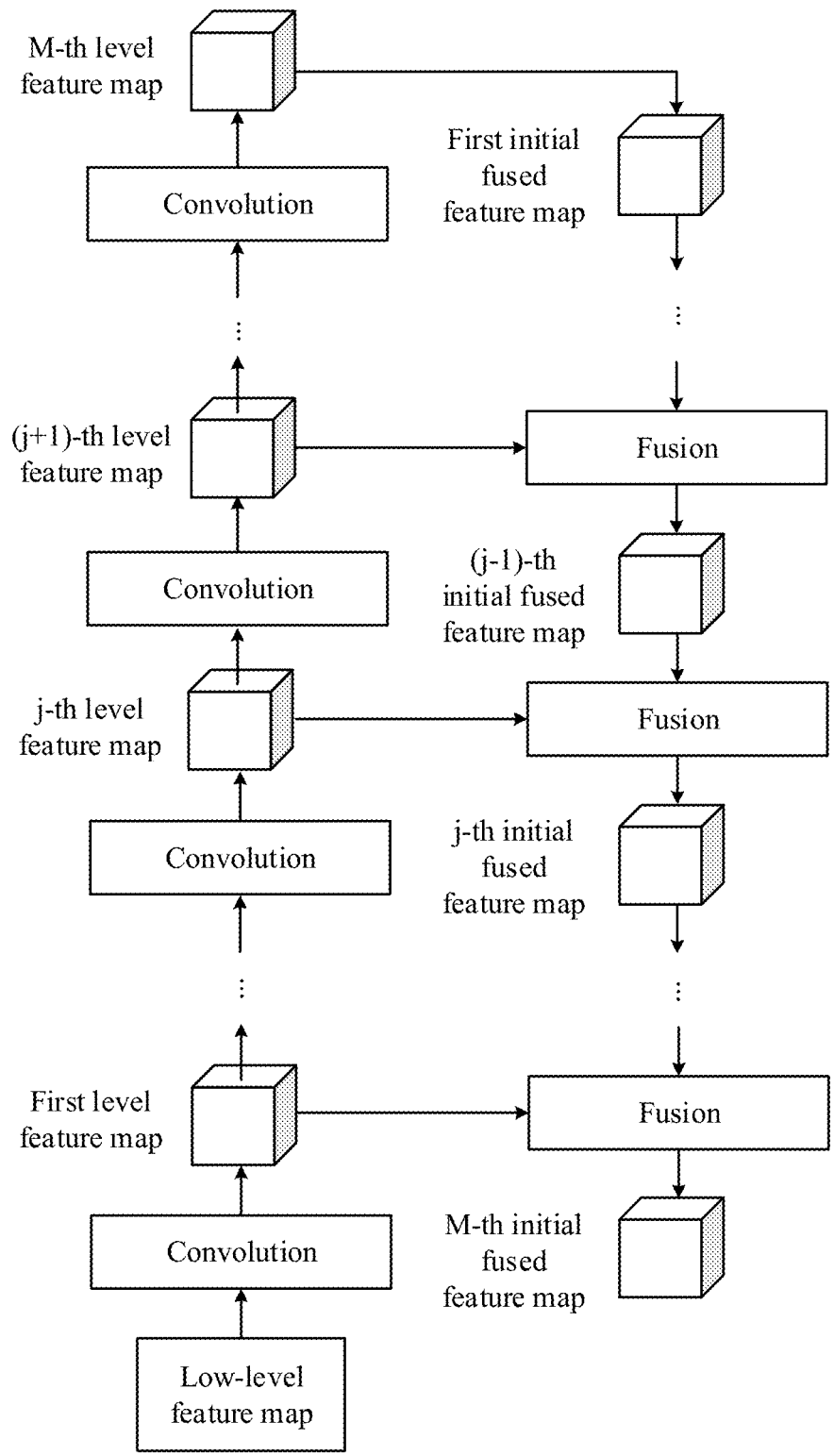
FIG. 3(a) is a structural schematic diagram of a first sub-network layer according to an embodiment of the present disclosure.

Further, in an example, as shown in FIG. 3(a), a j-th initial fused feature map among the M initial fused feature maps is obtained by:
  convolving a j-th level feature map for feature extraction to obtain a (j+1)-th level feature map, where the first level feature map is obtained by convolving the low-level feature map when j is 1, so that M level feature maps can be obtained;
  when j is M, directly using the M-th level feature map as the first initial fused feature map; and
  when the value of j is an integer greater than or equal to 1 and less than or equal to M−1, fusing the j-th level feature map with a (j−1)-th initial fused feature map to obtain the j-th initial fused feature map.

Figure 3B:
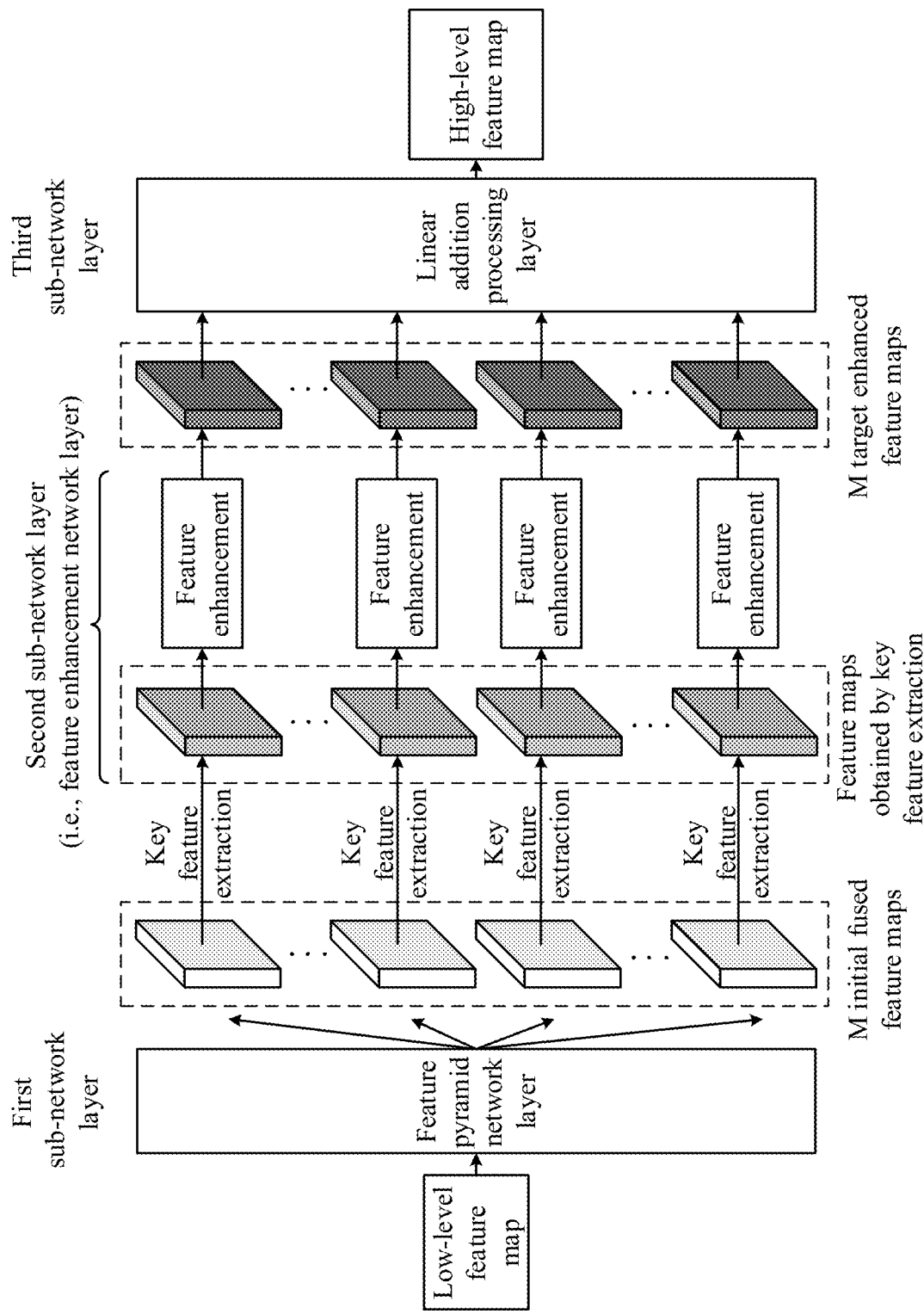
FIG. 3(b) is a structural schematic diagram of a second network layer in an example according to an embodiment of the present disclosure.

For example, the first sub-network layer is a feature pyramid network (FPN) layer, the second sub-network layer is a feature enhancement network layer, and the third sub-network layer is a linear addition (Add) processing layer. As shown in FIG. 3(b), firstly, the low-level feature map is input into the FPN layer to obtain M initial fused feature maps; secondly, the obtained initial fused feature maps are input into the feature enhancement network layer, for example, the key features are extracted from the initial fused feature maps through the feature enhancement network layer, and the extracted feature maps are subjected to feature enhancement to obtain M target enhanced feature maps; and finally, the obtained M target enhanced feature maps are input into the linear addition processing layer to obtain the high-level feature map, thus helping improve the accuracy of defect and weak defect detection, and laying a foundation for subsequent improvements in the production quality and production efficiency of spinning.

Here, in an example, an i-th target enhancement feature map among the M target enhancement feature maps is obtained by:
  convolving an i-th initial fused feature map to obtain an i-th weight factor based on a convolution processing result; fusing an (i+1)-th initial fused feature map with the i-th initial fused feature map based on the i-th weight factor, to obtain the i-th target fused feature map; extracting key features from the obtained i-th target fused feature map, and enhancing a plurality of extracted feature maps respectively to obtain a plurality of i-th initial enhanced feature maps; and fusing the plurality of i-th initial enhanced feature maps to obtain the i-th target enhanced feature map. Here, i is an integer greater than or equal to 1 and less than or equal to M−1.

Further, when i is M, an (M+1)-th initial fused feature map may be a preset value. At this time, an M-th target fused feature map can be obtained, and then the M-th target enhanced feature map can be obtained. Alternatively, the M-th target enhanced feature map may be obtained by:
  extracting key features from the M-th initial fused feature map, enhancing a plurality of extracted feature maps respectively to obtain a plurality of M-th initial enhanced feature maps, and fusing the plurality of M-th initial enhanced feature maps to obtain the M-th target enhanced feature map.

Figure 3C:
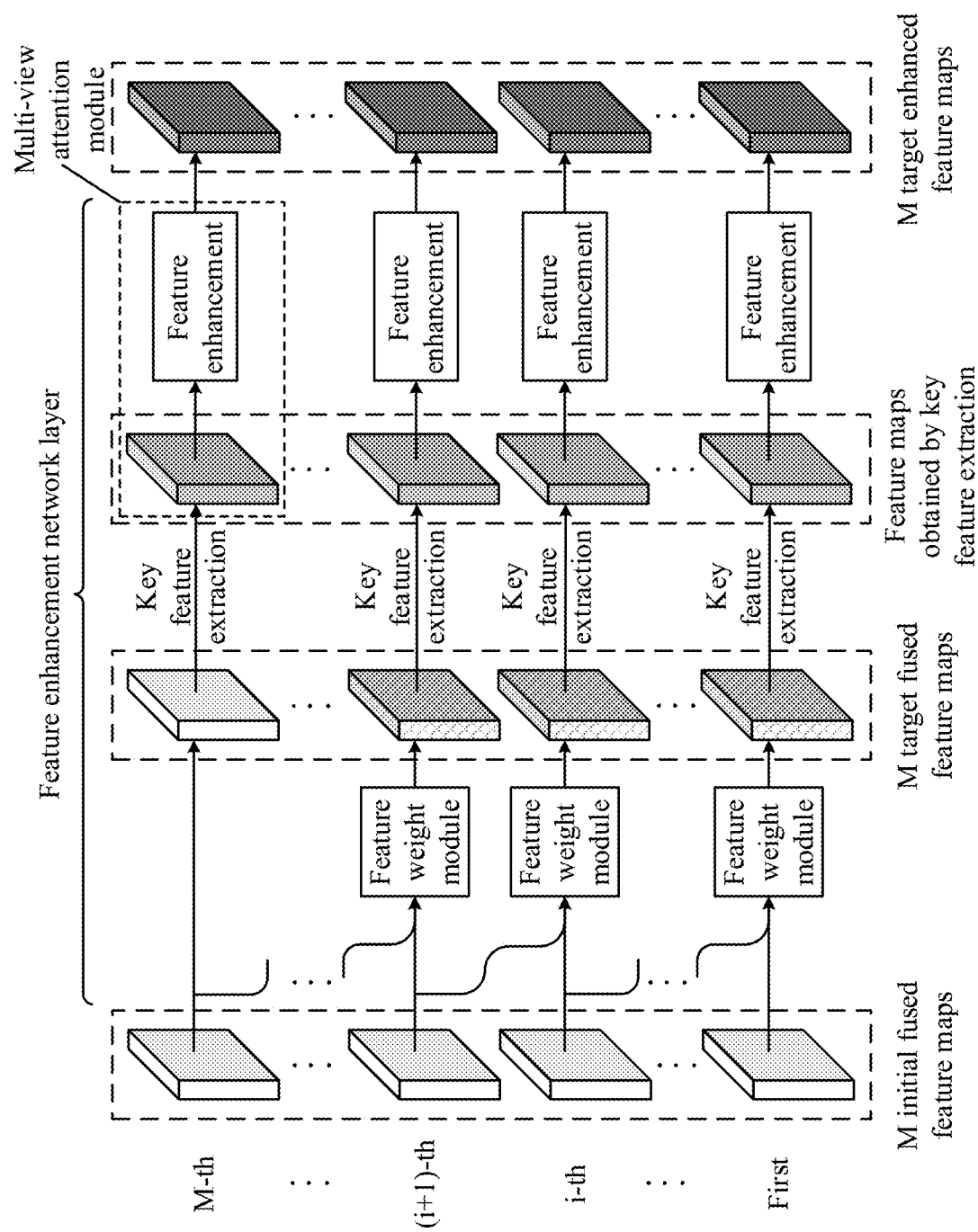
FIG. 3(c) is a structural schematic diagram of a second sub-network layer in another example according to an embodiment of the present disclosure.

For example, continue to take the second sub-network layer being a feature enhancement network layer for example. At this time, the feature enhancement network layer may further specifically include a feature weight module and a multi-view attention module. As shown in FIG. 3(c), the i-th initial fused feature map and the (i+1)-th initial fused feature map among the M initial fused feature maps are input into the feature weight module to obtain the i-th target fused feature map, and the i-th target fused feature map is input into the multi-view attention module to perform key feature extraction and feature enhancement to obtain the i-th target enhanced feature map. Furthermore, for the M-th initial fused feature map, the M-th initial fused feature map can be directly used as the M-th target fused feature map, and the obtained M-th target fused feature map is input into a multi-view attention module to perform key feature extraction and feature enhancement to obtain the M-th target enhanced feature map.

Figure 3D:
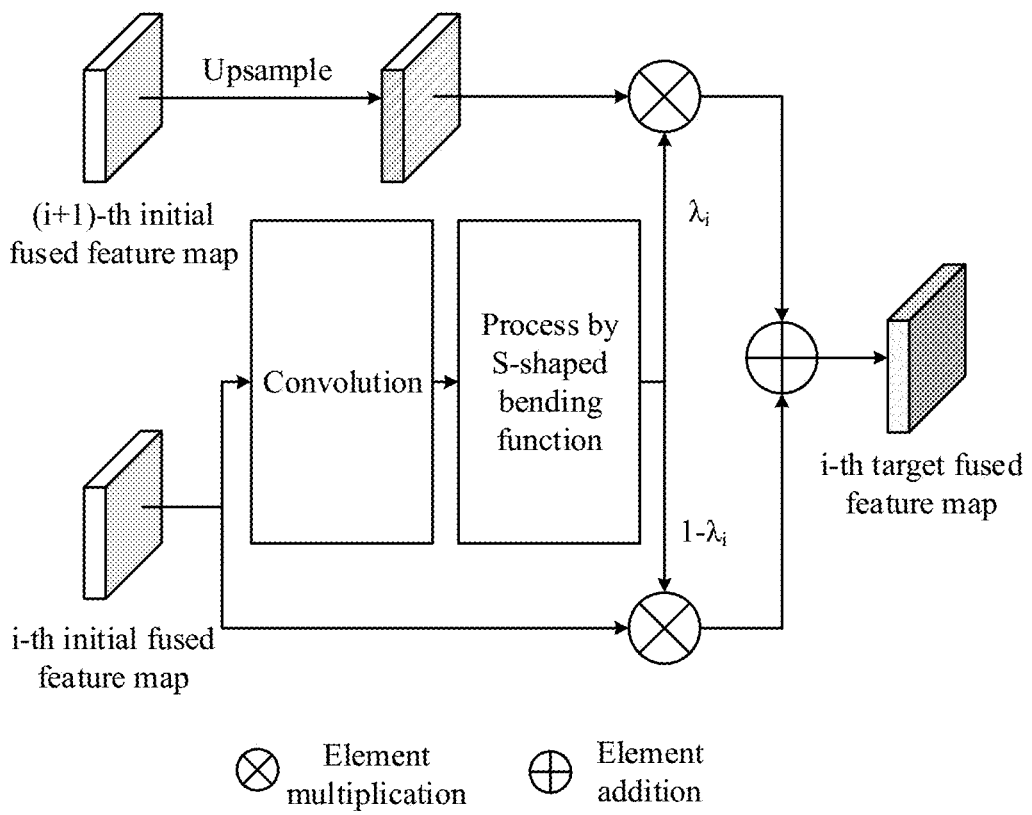
FIG. 3(d) is a structural schematic diagram of a feature weight module according to an embodiment of the present disclosure.

Further, as shown in FIG. 3(d), the feature weight module is configured to: firstly upsample the (i+1)-th initial fused feature map to obtain a processed (i+1)-th initial fused feature map; convolve the i-th initial fused feature map, and process the obtained result by the S-shaped bending function (Sigmod) to obtain an i-th weight factor (such as $\lambda_i$, or $1-\lambda_i$ in the figure), secondly perform element multiplication of the i-th weight factor (such as $1-\lambda_i$) and the i-th initial fused feature map, perform element multiplication of $\lambda_i$ and the processed (i+1)-th initial fused feature map, and perform element addition of the obtained results to obtain the i-th target fused feature map. Here, when i is M, the M-th initial fused feature map does not need to be input into the feature weight module and can be directly used as the M-th target fused feature map.

Figure 3E:
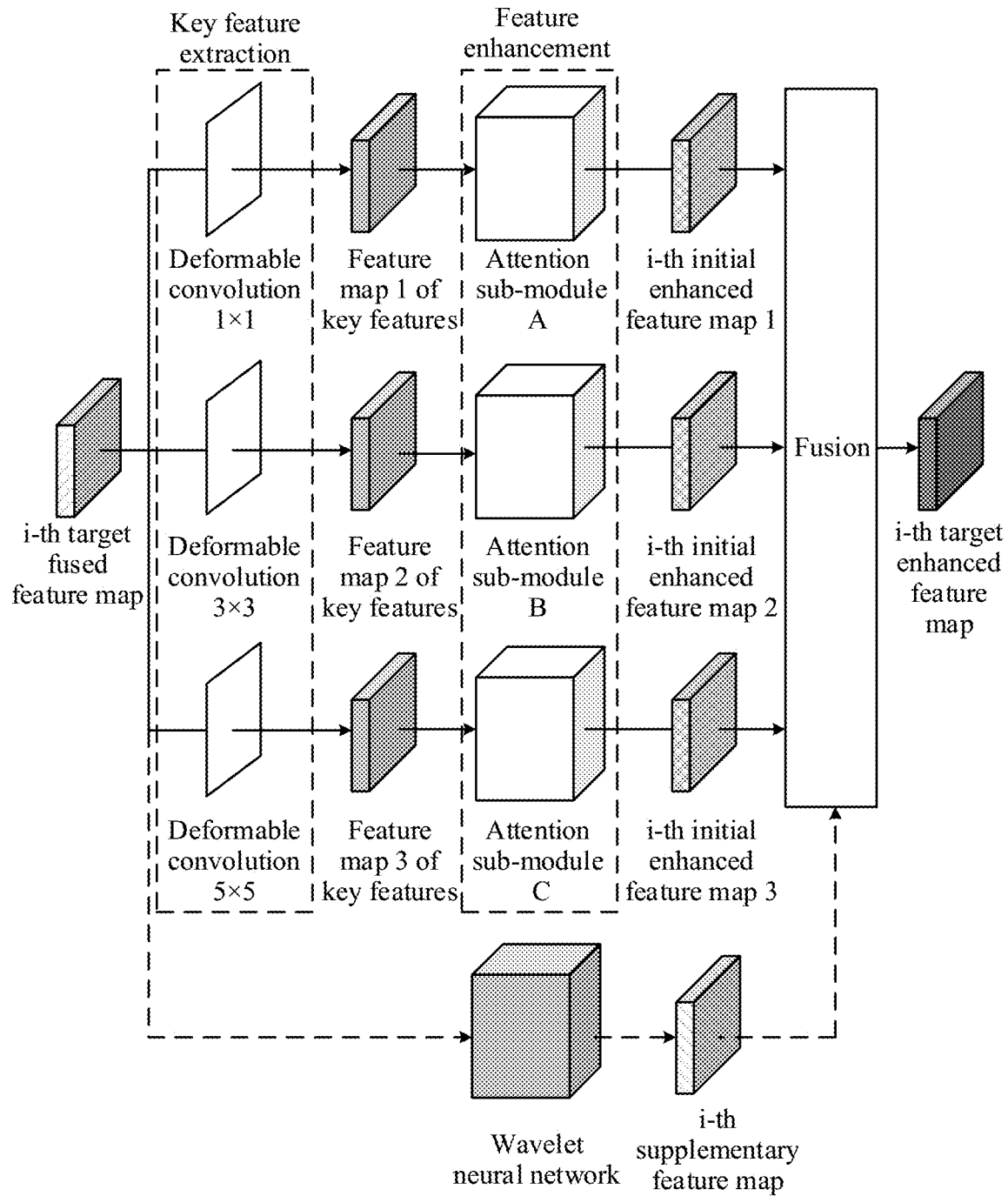
FIG. 3(e) is a structural schematic diagram of a multi-view attention module according to an embodiment of the present disclosure.

Further, as shown in FIG. 3(e), the multi-view attention module is configured to: firstly perform deformable convolution of a first preset convolution kernel (for example, 1×1) on the i-th target fused feature map to extract key features and obtain a feature map 1 of the key features, perform deformable convolution of a second preset convolution kernel (for example, 3×3) on the i-th target fused feature map to obtain a feature map 2 of key features, and perform deformable convolution of a third preset convolution kernel (for example, 5×5) on the i-th target fused feature map to obtain a feature map 3 of key features; secondly input the obtained feature map 1 into an attention submodule A to enhance the feature map 1 and obtain an i-th initial enhanced feature map 1, and similarly, input the feature map 2 into an attention submodule B to obtain an i-th initial enhanced feature map 2, and input the feature map 3 into an attention submodule C to obtain an i-th initial enhanced feature map 3; and finally fuse the three i-th initial enhanced feature maps (for example, element addition) to obtain the i-th target enhanced feature map.

Further, based on FIG. 3(e), a neural network may be added. For example, a wavelet neural network is added, to utilize the wavelet neural network to directly perform feature extraction on the i-th target fused feature map to obtain an i-th supplementary feature map, and fuse it with the three i-th initial enhanced feature maps described above.

It should be pointed out that the structure in the attention sub-module (such as the attention sub-module A, or the attention sub-module B, or the attention sub-module C) contained in the multi-view attention module may be a squeeze and excitation (SE) network or may be any other network structure obtained based on the SE network, which is not limited in the solution of the present disclosure.

In this way, the solution of the present disclosure can make full use of the second sub-network layer to extract key features from the low-level feature map and perform feature enhancement on the extracted result, thus directing the network attention to a potential target (i.e., the defect in the spinning box), and facilitating the subsequent better defect identification. Especially for the yarns and the background board with colors difficult to distinguish in the spinning box, the key features can be obtained more comprehensively, thereby improving the accuracy of defect detection, and laying a foundation for subsequent improvements in the production quality and production efficiency of spinning.

In yet another example of the solution of the present disclosure, the third network layer includes a fourth sub-network layer and a fifth sub-network layer.

Here, the fourth sub-network layer is used to select a candidate area of a suspected defect in the image based on the high-level feature map; and the fifth sub-network layer is used to identify whether there is a defect in the candidate area based on the high-level feature map and the selected candidate area, thus efficiently identifying possible defects in the spinning box, and laying a foundation for subsequent improvements in the production quality and production efficiency of spinning.

Figure 4:
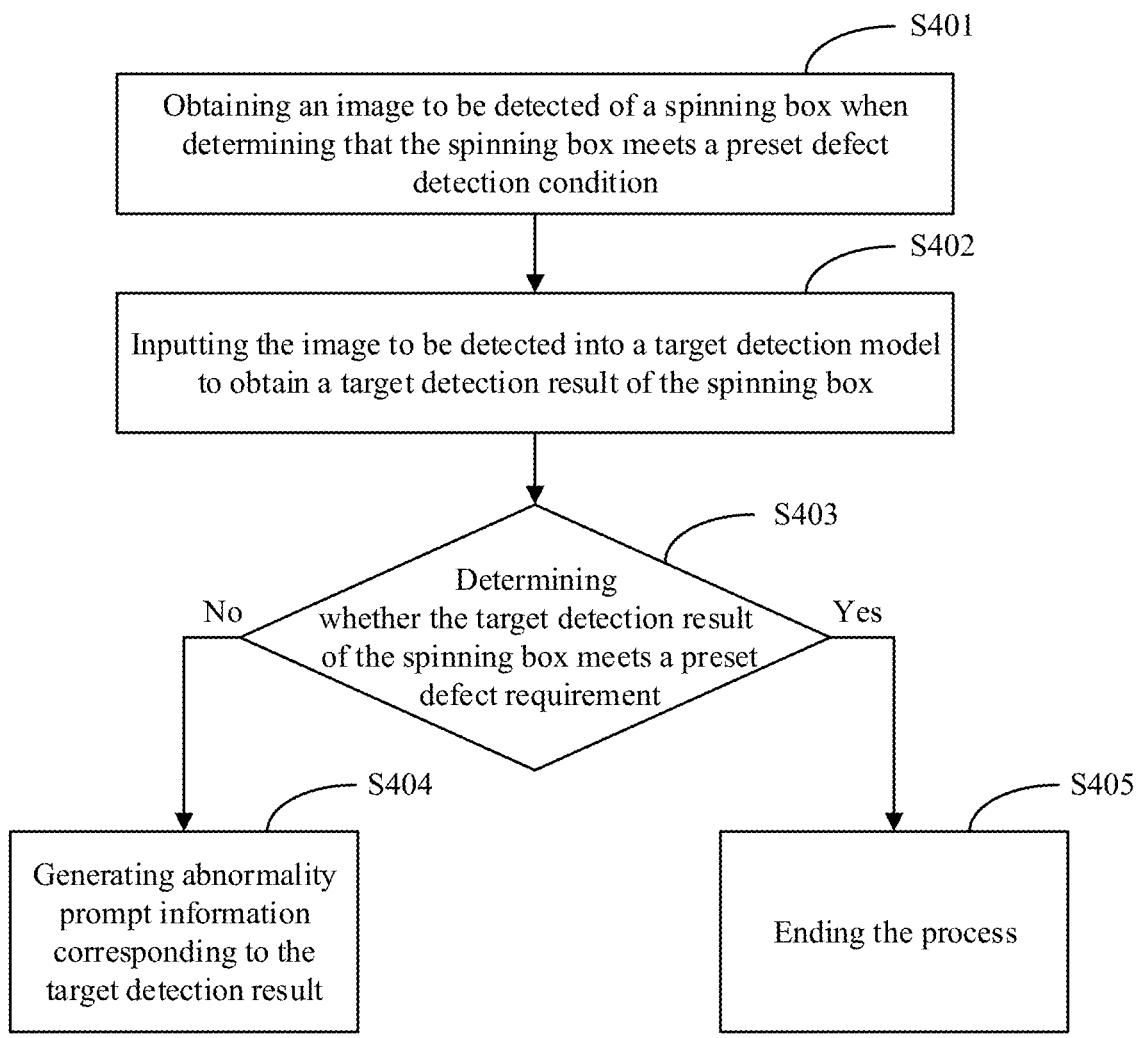
FIG. 4 is a second schematic flow chart of a spinning box detection method according to an embodiment of the present disclosure.

FIG. 4 is a second schematic flow chart of a spinning box detection method according to an embodiment of the present disclosure. This method is optionally applied to electronic devices, such as personal computers, servers, server clusters and other electronic devices. It can be understood that the relevant content of the method shown in FIG. 1 described above may also be applied to this example, and the relevant content will not be repeated in this example.

Further, this method includes at least a part of the following content. As shown in FIG. 4, this method includes the following steps.

Step S401: An image to be detected of a spinning box is obtained when it is determined that the spinning box meets a preset defect detection condition.

Step S402: The image to be detected is input into a target detection model to obtain a target detection result of the spinning box.

Here, the target detection model is used to detect whether there is a defect in the spinning box to obtain the target detection result; and the target detection result includes at least one of: a total quantity of defects, a defect position or a defect type.

Step S403: Whether the target detection result of the spinning box meets a preset defect requirement is determined. If so, proceed to step S405, otherwise proceed to step S404.

Step S404: Abnormality prompt information corresponding to the target detection result is generated when it is determined that the target detection result of the spinning box does not meet the preset defect requirement.

Here, the abnormality prompt information is used to prompt that the spinning box has a defect.

Further, in a specific example, the abnormality prompt information may be generated in the following occasion to facilitate prompting the staff or robot to repair the spinning box, thereby further ensuring the production quality and production efficiency of spinning; and specifically, the above step of generating the abnormality prompt information corresponding to the target detection result when determining that the target detection result of the spinning box does not meet the preset defect requirement (for example, the above-mentioned step S404) specifically includes:

generating the abnormality prompt information corresponding to the target detection result when at least one of following conditions is met:
the total quantity of defects contained in the target detection result is greater than a second threshold;
the defect position contained in the target detection result is within a preset defect position range (for example, the total defect size is within the preset defect position range and exceeds a preset area); or
the defect type contained in the target detection result is within a preset defect type range (for example, if the target defect type includes all defect types contained in the first detection result, and there is at least one defect type falling into the preset defect type range, the target defect type can be considered to be within the preset defect type range).

Here, the second threshold is an empirical value, and may be set according to actual needs in practical applications. The second threshold is not specifically limited in the solution of the present disclosure.

Step S405: The process ends.

In this way, the solution of the present disclosure can generate corresponding prompt information when the preset defect requirement is not met based on the obtained defect detection result, thus making it easy to prompt the staff or robot to take corresponding measures on the spinning box, for example, repair the spinning box, so that the spinning production quality can meet the expected requirement, thereby ensuring the production efficiency of the workshop.

In summary, compared with the related art, the solution of the present disclosure has the following advantages, specifically including:
1) Realize automated processing. Compared with the existing manual method, the solution of the present disclosure can efficiently detect defects in the spinning box without relying on manual experience, thus realizing an automated processing flow, thereby saving a lot of manpower and time costs, and further improving the efficiency of defect detection.
2) Improve detection accuracy. The traditional manual detection method is difficult to detect relatively subtle defects such as yarn floating and yarn hooking in the spinning box, and is prone to missed detection; and the solution of the present disclosure uses the neural network model suitable for defect detection, and has higher detection accuracy especially for weak defects difficult to be detected, thus ensuring the quality of the yarn spindles produced by the spinning box.
3) Improve production efficiency. The solution of the present disclosure can perform automated and accurate defect detection on the spinning box, and then take corresponding measures (for example, generate prompt information or warning information or the like) timely according to the obtained detection result (for example, target detection result) to prompt the staff or robot to repair the spinning box, thus further ensuring normal production of spinning in the workshop.

Figure 5:
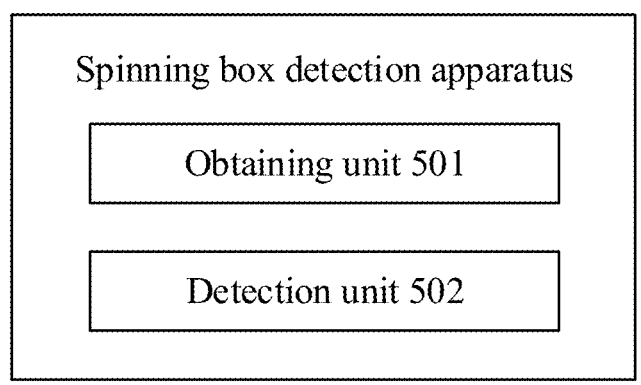
FIG. 5 is a structural schematic diagram of a spinning box detection apparatus according to an embodiment of the present disclosure.

The solution of the present disclosure further provides a spinning box detection apparatus, as shown in FIG. 5, including:
an obtaining unit 501 configured to obtain an image to be detected of a spinning box when determining that the spinning box meets a preset defect detection condition; and
a detection unit 502 configured to input the image to be detected into a target detection model to obtain a target detection result of the spinning box; where the target detection model is used to detect whether there is a defect in the spinning box to obtain the target detection result; and the target detection result includes at least one of: a total quantity of defects, a defect position or a defect type.

In a specific example of the solution of the present disclosure, the obtaining unit is specifically configured to:
obtain the image to be detected of the spinning box when determining that one of following conditions is met:
a detection time of the spinning box reaches preset detection time;
there are degraded yarn spindles among a plurality of yarn spindles obtained based on the spinning box; or
a quantity of degraded yarn spindles among the plurality of yarn spindles obtained based on the spinning box is greater than a first threshold.

In a specific example of the solution of the present disclosure, the apparatus further includes: an abnormality prompt unit;
where the abnormality prompt unit is configured to generate abnormality prompt information corresponding to the target detection result when determining that the target detection result of the spinning box does not meet a preset defect requirement; where the abnormality prompt information is used to indicate a defect degree of the spinning box.

In a specific example of the solution of the present disclosure, the abnormality prompt unit is specifically configured to:
generate the abnormality prompt information corresponding to the target detection result when at least one of following conditions is met:
the total quantity of defects contained in the target detection result is greater than a second threshold;
the defect position contained in the target detection result is within a preset defect position range; or
the defect type contained in the target detection result is within a preset defect type range.

In a specific example of the solution of the present disclosure, the target detection model at least includes a first network layer, a second network layer and a third network layer;
the first network layer is used to filter out background noise from the input image to be detected to extract a low-level feature map; where the first network layer at least includes an initial convolution module, a weight distribution module, a wavelet convolution module and a feature fusion module; the initial convolution module is configured to at least perform wavelet transform on the image to be detected to obtain a first low-frequency feature map; the weight distribution module is configured to obtain a target weight factor of a feature map of the input image; the wavelet convolution module is configured to perform wavelet transform on the image to be detected to obtain a global feature map representing a low-frequency component and a high-frequency component; and the feature fusion module is configured to fuse the first low-frequency feature map with the global feature map based on the target weight factor to filter out the background noise and obtain the low-level feature map;
the second network layer is used to perform feature enhancement on the low-level feature map to obtain a high-level feature map; and
the third network layer is used to perform defect recognition based on the high-level feature map to obtain the target detection result.

In a specific example of the solution of the present disclosure, the initial convolution module is configured to convolve the image to be detected to obtain a first convolution feature map, and perform wavelet transform on the obtained first convolution feature map to obtain the first low-frequency feature map.

In a specific example of the solution of the present disclosure, the weight distribution module is configured to convolve the image to be detected to obtain a second convolution feature map, perform wavelet transform on the obtained second convolution feature map to obtain a second low-frequency feature map, and perform nonlinear transform on the obtained second low-frequency feature map to obtain the target weight factor.

In a specific example of the solution of the present disclosure, the feature fusion module is configured to process the first low-frequency feature map and the target weight factor at element level, process the global feature map and the target weight factor at element level, and perform element addition of results obtained after processing at element level to filter out the background noise and obtain the low-level feature map.

For the description of specific functions and examples of the units of the apparatus of the embodiment of the present disclosure, reference may be made to the relevant description of the corresponding steps in the above method embodiments, and details are not repeated here.

In the technical solution of the present disclosure, the acquisition, storage and application of the user's personal information involved are in compliance with relevant laws and regulations, and do not violate public order and good customs.

Figure 6:
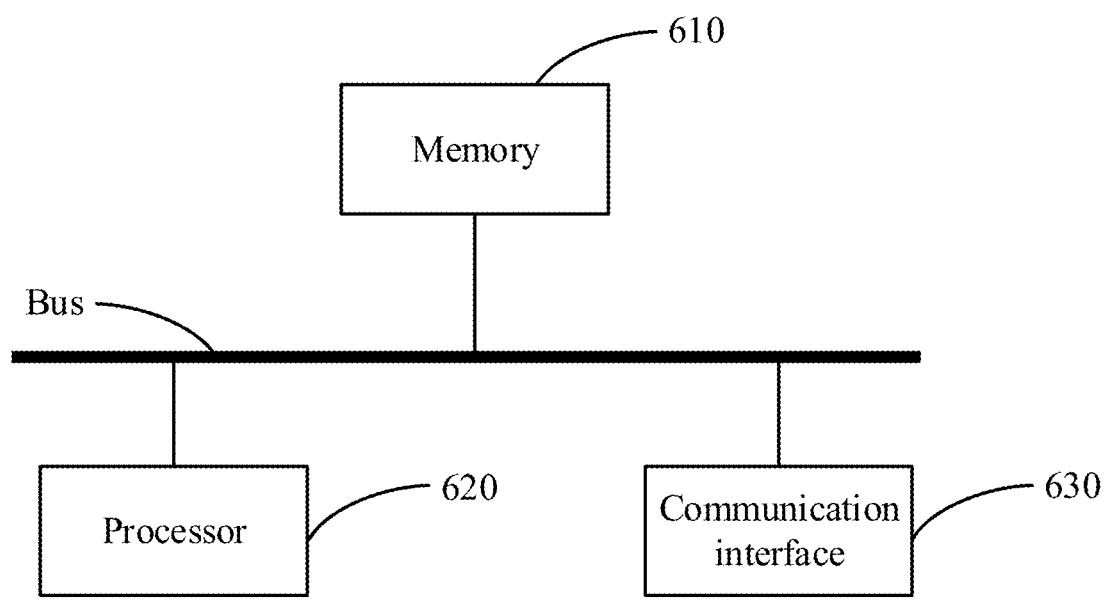
FIG. 6 is a block diagram of an electronic device used to implement a spinning box detection method according to an embodiment of the present disclosure.

FIG. 6 is a structural block diagram of an electronic device according to an embodiment of the present disclosure. As shown in FIG. 6, the electronic device includes: a memory 610 and a processor 620, and the memory 610 stores a computer program that can run on the processor 620. There may be one or more memories 610 and processors 620. The memory 610 may store one or more computer programs, and the one or more computer programs cause the electronic device to perform the method provided in the above method embodiment, when executed by the electronic device. The electronic device may also include: a communication interface 630 configured to communicate with an external device for data interactive transmission.

If the memory 610, the processor 620 and the communication interface 630 are implemented independently, the memory 610, the processor 620 and the communication interface 630 may be connected to each other and complete communication with each other via a bus. The bus may be an industry standard architecture (ISA) bus, a peripheral component interconnect (PCI) bus, or an extended industry standard architecture (EISA) bus, etc. The bus may be divided into an address bus, a data bus, a control bus, etc. For ease of representation, the bus is represented by only one thick line in FIG. 6, but this thick line does not represent only one bus or only one type of bus.

Optionally, in a specific implementation, if the memory 610, the processor 620 and the communication interface 630 are integrated on one chip, the memory 610, the processor 620 and the communication interface 630 may communicate with each other through an internal interface.

It should be understood that the above processor may be a central processing unit (CPU) or other general-purpose processor, a digital signal processor (DSP), an application specific integrated circuit (ASIC), a field programmable gate array (FPGA) or other programmable logic device, a discrete gate or transistor logic device, a discrete hardware component, etc. The general-purpose processor may be a microprocessor or any conventional processor, etc. It is worth noting that the processor may be a processor that supports an advanced RISC machines (ARM) architecture.

Further, optionally, the above memory may include a read-only memory and a random access memory, and may also include a non-volatile random access memory. The memory may be a volatile memory or a non-volatile memory, or may include both a volatile memory and a non-volatile memory. Here, the non-volatile memory may include a read-only memory (ROM), a programmable ROM (PROM), an erasable PROM (EPROM), an electrically EPROM (EEPROM) or a flash memory. The volatile memory may include a random access memory (RAM), which acts as an external cache. By way of illustration and not limitation, many forms of RAMs are available, for example, a static RAM (SRAM), dynamic random access memory (DRAM), a synchronous DRAM (SDRAM), a double data rate SDRAM (DDR SDRAM), an enhanced SDRAM (ESDRAM), a synchlink DRAM (SLDRAM) and a direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, digital versatile disc (DVD)), or semiconductor media (for example, solid state disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above storage medium may be a read-only memory, a magnetic disk or an optical disk, etc.

In the description of the embodiments of the present disclosure, the description with reference to the terms "an embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the quantity of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A spinning box detection method, comprising:
obtaining an image to be detected of a spinning box when determining that the spinning box meets a preset defect detection condition, wherein the image to be detected at least comprises image content of a spinneret plate, yarns, a yarn guide hook and an oil nozzle in the spinning box; and
inputting the image to be detected into a target detection model to obtain a target detection result of the spinning box; wherein the target detection model is used to detect whether there is a defect in the spinning box to obtain the target detection result; and the target detection result comprises at least one of: a total quantity of defects, a defect position or a defect type;
wherein the target detection model at least comprises a first network layer, a second network layer and a third network layer;
the first network layer is used to filter out background noise from the input image to be detected to extract a low-level feature map; wherein the first network layer at least comprises an initial convolution module, a weight distribution module, a wavelet convolution module and a feature fusion module; the initial convolution module is configured to at least perform wavelet transform on the image to be detected to obtain a first low-frequency feature map; the weight distribution module is configured to obtain a target weight factor of a feature map of the input image; the wavelet convolution module is configured to perform wavelet transform on the image to be detected to obtain a global feature map representing a low-frequency component and a high-frequency component; and the feature fusion module is configured to fuse the first low-frequency feature map with the global feature map based on the target weight factor to filter out the background noise and obtain the low-level feature map;
the second network layer is used to perform feature enhancement on the low-level feature map to obtain a high-level feature map; and
the third network layer is used to perform defect recognition based on the high-level feature map to obtain the target detection result.

2. The method of claim 1, wherein the obtaining an image to be detected of a spinning box when determining that the spinning box meets a preset defect detection condition, comprises:
obtaining the image to be detected of the spinning box when determining that one of following conditions is met:
a detection time of the spinning box reaches preset detection time;
there are degraded yarn spindles among a plurality of yarn spindles obtained based on the spinning box; or
a quantity of degraded yarn spindles among the plurality of yarn spindles obtained based on the spinning box is greater than a first threshold.

3. The method of claim 1, further comprising:
generating abnormality prompt information corresponding to the target detection result when determining that the target detection result of the spinning box does not meet a preset defect requirement; wherein the abnormality prompt information is used to indicate a defect degree of the spinning box.

4. The method of claim 3, wherein the generating abnormality prompt information corresponding to the target detection result when determining that the target detection result of the spinning box does not meet a preset defect requirement, comprises:
generating the abnormality prompt information corresponding to the target detection result when at least one of following conditions is met:
the total quantity of defects contained in the target detection result is greater than a second threshold;
the defect position contained in the target detection result is within a preset defect position range; or
the defect type contained in the target detection result is within a preset defect type range.

5. The method of claim 1, wherein the initial convolution module is configured to convolve the image to be detected to obtain a first convolution feature map, and perform wavelet transform on the obtained first convolution feature map to obtain the first low-frequency feature map.

6. The method of claim 1, wherein the weight distribution module is configured to convolve the image to be detected to obtain a second convolution feature map, perform wavelet transform on the obtained second convolution feature map to obtain a second low-frequency feature map, and perform nonlinear transform on the obtained second low-frequency feature map to obtain the target weight factor.

7. The method of claim 1, wherein the feature fusion module is configured to process the first low-frequency feature map and the target weight factor at element level, process the global feature map and the target weight factor at element level, and perform element addition of results obtained after processing at element level to filter out the background noise and obtain the low-level feature map.

8. An electronic device, comprising:
at least one processor; and
a memory connected in communication with the at least one processor;
wherein the memory stores an instruction executable by the at least one processor, and the instruction, when executed by the at least one processor, enables the at least one processor to execute:
obtaining an image to be detected of a spinning box when determining that the spinning box meets a preset defect detection condition, wherein the image to be detected at least comprises image content of a spinneret plate, yarns, a yarn guide hook and an oil nozzle in the spinning box; and
inputting the image to be detected into a target detection model to obtain a target detection result of the spinning box; wherein the target detection model is used to detect whether there is a defect in the spinning box to obtain the target detection result; and the target detection result comprises at least one of: a total quantity of defects, a defect position or a defect type;
wherein the target detection model at least comprises a first network layer, a second network layer and a third network layer;
the first network layer is used to filter out background noise from the input image to be detected to extract a low-level feature map; wherein the first network layer at least comprises an initial convolution module, a weight distribution module, a wavelet convolution module and a feature fusion module; the initial convolution module is configured to at least perform wavelet transform on the image to be detected to obtain a first low-frequency feature map; the weight distribution module is configured to obtain a target weight factor of a feature map of the input image; the wavelet convolution module is configured to perform wavelet transform on the image to be detected to obtain a global feature map representing a low-frequency component and a high-frequency component; and the feature fusion module is configured to fuse the first low-frequency feature map with the global feature map based on the target weight factor to filter out the background noise and obtain the low-level feature map;

the second network layer is used to perform feature enhancement on the low-level feature map to obtain a high-level feature map; and the third network layer is used to perform defect recognition based on the high-level feature map to obtain the target detection result.

9. The electronic device of claim 8, wherein the obtaining an image to be detected of a spinning box when determining that the spinning box meets a preset defect detection condition, comprises:

obtaining the image to be detected of the spinning box when determining that one of following conditions is met:

a detection time of the spinning box reaches preset detection time;

there are degraded yarn spindles among a plurality of yarn spindles obtained based on the spinning box; or a quantity of degraded yarn spindles among the plurality of yarn spindles obtained based on the spinning box is greater than a first threshold.

10. The electronic device of claim 8, wherein the instruction, when executed by the at least one processor, enables the at least one processor to further execute:

generating abnormality prompt information corresponding to the target detection result when determining that the target detection result of the spinning box does not meet a preset defect requirement; wherein the abnormality prompt information is used to indicate a defect degree of the spinning box.

11. The electronic device of claim 10, wherein the generating abnormality prompt information corresponding to the target detection result when determining that the target detection result of the spinning box does not meet a preset defect requirement, comprises:

generating the abnormality prompt information corresponding to the target detection result when at least one of following conditions is met:

the total quantity of defects contained in the target detection result is greater than a second threshold;

the defect position contained in the target detection result is within a preset defect position range; or the defect type contained in the target detection result is within a preset defect type range.

12. The electronic device of claim 8, wherein the initial convolution module is configured to convolve the image to be detected to obtain a first convolution feature map, and perform wavelet transform on the obtained first convolution feature map to obtain the first low-frequency feature map.

13. A non-transitory computer-readable storage medium storing a computer instruction thereon, wherein the computer instruction is used to cause a computer to execute:

obtaining an image to be detected of a spinning box when determining that the spinning box meets a preset defect detection condition, wherein the image to be detected at least comprises image content of a spinneret plate, yarns, a yarn guide hook and an oil nozzle in the spinning box; and inputting the image to be detected into a target detection model to obtain a target detection result of the spinning box; wherein the target detection model is used to detect whether there is a defect in the spinning box to obtain the target detection result; and the target detection result comprises at least one of: a total quantity of defects, a defect position or a defect type;

wherein the target detection model at least comprises a first network layer, a second network layer and a third network layer;

the first network layer is used to filter out background noise from the input image to be detected to extract a low-level feature map; wherein the first network layer at least comprises an initial convolution module, a weight distribution module, a wavelet convolution module and a feature fusion module; the initial convolution module is configured to at least perform wavelet transform on the image to be detected to obtain a first low-frequency feature map; the weight distribution module is configured to obtain a target weight factor of a feature map of the input image; the wavelet convolution module is configured to perform wavelet transform on the image to be detected to obtain a global feature map representing a low-frequency component and a high-frequency component; and the feature fusion module is configured to fuse the first low-frequency feature map with the global feature map based on the target weight factor to filter out the background noise and obtain the low-level feature map;

the second network layer is used to perform feature enhancement on the low-level feature map to obtain a high-level feature map; and the third network layer is used to perform defect recognition based on the high-level feature map to obtain the target detection result.

14. The non-transitory computer-readable storage medium of claim 13, wherein the obtaining an image to be detected of a spinning box when determining that the spinning box meets a preset defect detection condition, comprises:

obtaining the image to be detected of the spinning box when determining that one of following conditions is met:

a detection time of the spinning box reaches preset detection time;

there are degraded yarn spindles among a plurality of yarn spindles obtained based on the spinning box; or a quantity of degraded yarn spindles among the plurality of yarn spindles obtained based on the spinning box is greater than a first threshold.

15. The non-transitory computer-readable storage medium of claim 13, wherein the computer instruction is used to cause the computer to further execute:

generating abnormality prompt information corresponding to the target detection result when determining that the target detection result of the spinning box does not meet a preset defect requirement; wherein the abnormality prompt information is used to indicate a defect degree of the spinning box.

16. The non-transitory computer-readable storage medium of claim 15, wherein the generating abnormality prompt information corresponding to the target detection result when determining that the target detection result of the spinning box does not meet a preset defect requirement, comprises:

generating the abnormality prompt information corresponding to the target detection result when at least one of following conditions is met:

the total quantity of defects contained in the target detection result is greater than a second threshold;

the defect position contained in the target detection result is within a preset defect position range; or the defect type contained in the target detection result is within a preset defect type range.

17. The non-transitory computer-readable storage medium of claim 13, wherein the initial convolution module is configured to convolve the image to be detected to obtain a first convolution feature map, and perform wavelet transform on the obtained first convolution feature map to obtain the first low-frequency feature map.

18. The non-transitory computer-readable storage medium of claim 13, wherein the weight distribution module is configured to convolve the image to be detected to obtain a second convolution feature map, perform wavelet transform on the obtained second convolution feature map to obtain a second low-frequency feature map, and perform nonlinear transform on the obtained second low-frequency feature map to obtain the target weight factor.

19. The non-transitory computer-readable storage medium of claim 13, wherein the feature fusion module is configured to process the first low-frequency feature map and the target weight factor at element level, process the global feature map and the target weight factor at element level, and perform element addition of results obtained after processing at element level to filter out the background noise and obtain the low-level feature map.

20. The electronic device of claim 8, wherein the weight distribution module is configured to convolve the image to be detected to obtain a second convolution feature map, perform wavelet transform on the obtained second convolution feature map to obtain a second low-frequency feature map, and perform nonlinear transform on the obtained second low-frequency feature map to obtain the target weight factor.

* * * * *